United States Patent [19]
Zwarts

[11] 3,874,237
[45] Apr. 1, 1975

[54] LIQUID LEVEL HEIGHT MEASURING APPARATUS

[75] Inventor: Cornelis M. G. Zwarts, Pointe Gatineau, Quebec, Canada

[73] Assignee: Canadian Patents and Development Limited, Ottawa, Canada

[22] Filed: Feb. 15, 1973

[21] Appl. No.: 332,544

[52] U.S. Cl. .............................................. 73/290 R
[51] Int. Cl. ........................................... G01f 23/28
[58] Field of Search ......... 73/304 R, 290 R; 174/28, 174/290 W; 324/58.5 B, 58 B

[56] References Cited
UNITED STATES PATENTS

| | | | |
|---|---|---|---|
| 3,424,002 | 1/1969 | Johnson | 73/290 R |
| 3,474,337 | 10/1969 | Petrick | 73/304 R |
| 3,652,778 | 3/1972 | Sakai | 174/28 |
| 3,695,107 | 10/1972 | Hertz et al. | 73/290 R |
| 3,703,829 | 11/1972 | Dougherty | 73/290 R |
| 3,786,170 | 1/1974 | Floessel | 174/28 |

Primary Examiner—Donald O. Woodiel
Attorney, Agent, or Firm—James R. Hughes

[57] ABSTRACT

A liquid level height measuring device that is a transmission line oscillator comprising a parallel conductor transmission line positionable in the liquid whose height is to be measured and a sensor in the form of a switching device whose switching frequency is dependent only on transmission line length and thus on liquid level. The transmission line preferably includes a length of flexible coaxial cable connected in series to a rigid coaxial conductor structure with the center conductor positioned in relation to and electrically insulated from the outer conductor which has perforations over its working length for ready entry of the liquid into the space between conductors. The sensor is a two terminal bistable switching device, preferably a tunnel diode, connected to the transmission line such that a switching signal is generated whose frequency is dependent only on the transmission length.

5 Claims, 6 Drawing Figures

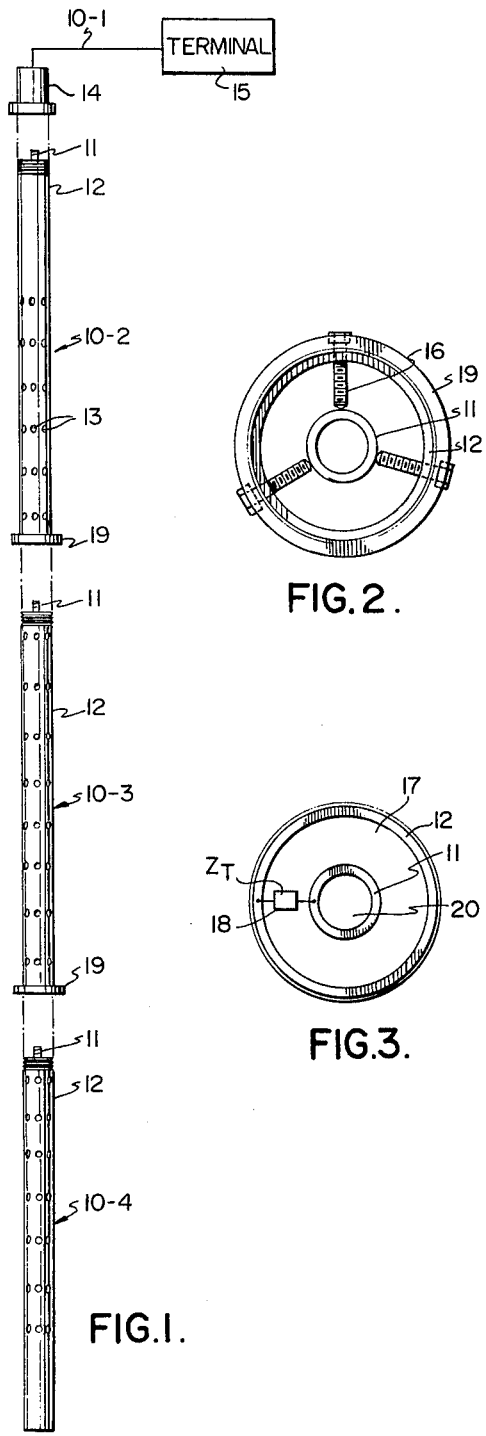

LIQUID LEVEL HEIGHT MEASURING APPARATUS

This invention relates to apparatus for measuring the height or level of liquids and more particularly to a liquid level height transducer for measuring rapidly varying water levels such as waves.

Many different types of liquid level measuring devices have been developed and put into use. Many use the capacitance between coaxial conductors in a series or paralled resonant LC-circuit. This method is non-linear and of course is restricted to non-conducting liquids. Another method uses the resistance measured between two wires but this is a non-linear system and restricted to conducting liquids. Another system uses a coaxial transmission line as a parallel resonance stub and although conducting and non-conducting liquids can be measured the system is non-linear unless used with some special arrangement such as a servo loop. Still another system, exemplified by U.S. Pat. No. 3,398,578 to B. E. Dozer on Aug. 27, 1968 and U.S. Pat. No. 3,474,337 to J. R. Petrick on Oct. 21, 1969, uses standard time domain reflectometry techniques with the addition of geometrical discontinuities to introduce calibration marks. This method is linear and can be used to measure heights of conducting and non-conducting fluids.

It is an object of the present invention to provide a liquid height measuring device that may be used to measure the height or level of conductive or high permittivity liquids and which provides a linear output.

Ir is another object of the invention to provide a liquid level measuring device that is simple, easy to maintain, and which is sufficiently rugged to be used in most applications where such characteristics are required.

It is another object of the invention to provide a liquid height measuring device that does not require a signal input generator and signal conversion steps and is therefore generally independent of parameters such as temperature, humidity, circuit component values, supply voltages, etc.

These and other objects of the invention are achieved by a liquid level height measuring device that is a transmission line oscillator comprising a parallel conductor transmission line positionable in the liquid whose height is to be measured and a sensor in the form of a switching device whose switching frequency is dependent only on transmission line length and thus on liquid level. The transmission line preferably includes a length of flexible coaxial cable connected in series to a rigid coaxial conductor structure with the center conductor positioned in relation to and electrically insulated from the outer conductor which has perforations over its working length for ready entry of the liquid into the space between conductors. The sensor is a two terminal bistable switching device, preferably a tunnel diode, connected to the transmission line such that a switching signal is generated whose frequency is dependent only on the transmission length.

In drawings which illustrate an embodiment of the invention,

FIG. 1 is a view of various sections of the coaxial transmission line assembly,

FIG. 2 is an end view of one section of the above assembly, showing internal construction and a coupling sleeve, FIG. 3 is a view of the end of the transmission line, showing the termination impedance in position.

Figure 4:
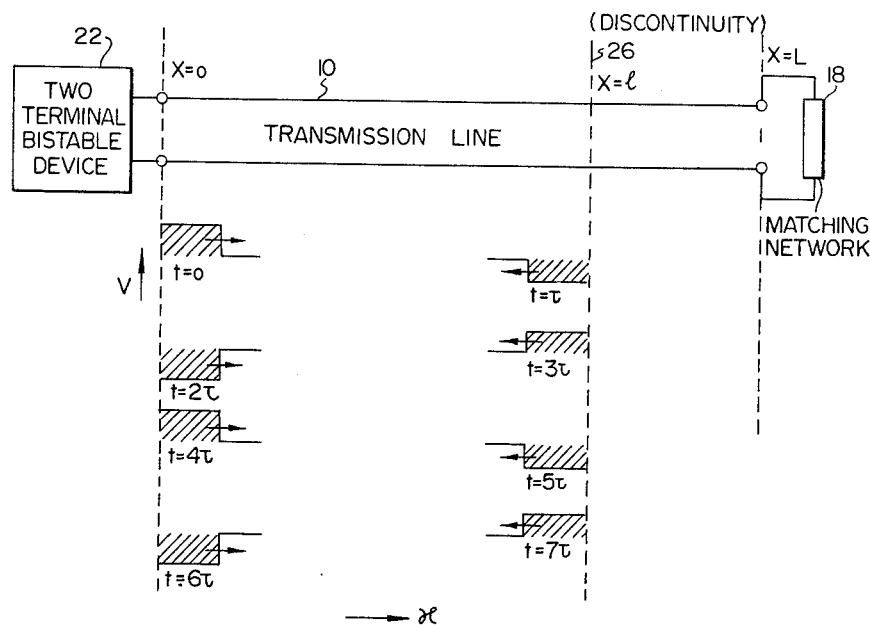
FIG. 4 is a schematic diagram illustrating the principle of operation of the device.

Referring to FIG. 1, coaxial transmission line 10 has rigid sections shown as 10-2, 10-3 and 10-4 which are made up of inner conductors 11 and outer conductors 12. These components are pipes of conducting metal such as stainless steel, aluminum, aluminum alloy, or other suitable metals. The ends of the conductors are threaded such that they may be assembled using coupling sleeves 19. This assembly would be placed in the liquid whose height is to be measured and the length of the assembly would be sufficient to accommodate the range of height variations. The outer pipe 12 contains perforations 13 over its operating length which allow quick and easy entry of the liquid into the central space between conductors. The liquid surface effectively provides a reflection causing discontinuity for the transmission line. It has also been found that the flow of liquid in and out of the structure through the apertures has a cleaning action and the device is not therefore susceptible to fouling-up. An internally threaded end cap 14 is fitted over the upper end with one end of a matching flexible coaxial cable 10-1 making contact with the rigid coaxial line and leading through the cap to the electronics package (not shown) via terminals 15. However the flexible coaxial cable and various components of the electronics package may be imbedded within the end cap using resin or some such material with leads passing through the cap and leading to a power supply and detector.

FIG. 2 shows one end of section 10-2 with inner conductor 11 internally threaded and outer conductor 12, externally threaded, and spaced by means of spacers 16 which may be screws of non-conducting material such as teflon nylon, etc. Also shown is the internally threaded coupling sleeve 19 used to connect sections of the transmission line. FIG. 3 shows the end of the last section in the transmission line with an insulating disc 17 between the conductors, a plug 20 in the end of conductor 11 and a matched terminating impedance 18 in position. The space may be filled with resin, thus imbedding the components.

Figure 5:
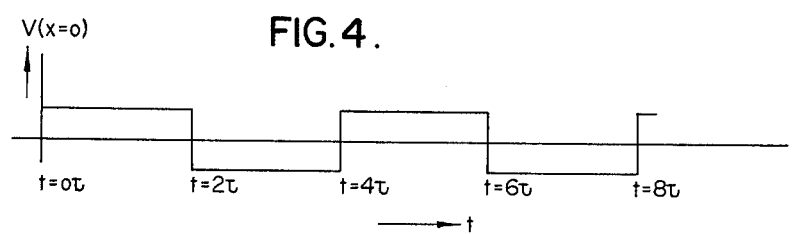
FIG. 5 shows the output signal of the device.

FIG. 4 is a schematic diagram illustrating the principle of operation of the device which consists of a two terminal bistable device 22, a transmission line 10 and a matching network 18. When the power supply is switched on to the bistable device it will assume either of two stable states, a wavefront travels down the line to a discontinuity 26 (e.g., a liquid surface) and is reflected partially back with phase reversal. When the echo signal returns to the two terminal bistable device it will trigger it into the other stable state and it will remain there for the duration of an additional $2t$ seconds, with $t = l/C$ being the one way propagation time, before it is switched back again to the original stable state. This process continues to produce a square wave oscillation, as shown on FIG. 5 with a period $T = 4t$ linearly related to the distance between the input terminals of the transmission line and the discontinuity (liquid surface). It is seen that the device has an important characteristic: the basic square wave oscillation engendered is immediately, without any intermediate steps, the useful output signal of which the oscillating period T is only a function of the distance $l$ being measured:

$$l = TC/4 \text{ or} \quad (1)$$

$$l = C/4f \quad (2)$$

where C = propagation speed of light and $f$ is the frequency of oscillation. The oscillation period or frequency can be readily measured.

Figure 6:
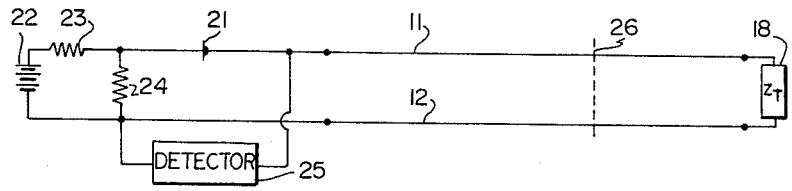
FIG. 6 is a detailed circuit diagram.

FIG. 6 is a diagram of a circuit for the device. A two terminal bistable device such as tunnel diode 21, connected to biassing resistors 23 and 24 and power supply 22, is directly connected to a transmission line of length L which includes a series connected flexible and rigid sections made up of paralled conductors 11 and 12, one end of the rigid transmission line is positioned in the fluid whose surface forms a reflecting barrier 26 a distance $l$ down the line. Although the line may be short circuited, it is preferable to have a terminating impedance 18 across the end of the line to prevent reflections from the discontinuity at this point which might otherwise interfere with the operation of the device. The tunnel diode 21 acts as the switching device and its period or frequency of oscillation is measured by means of a suitable period or frequency meter 25 or may be recorded to be processed at a later time. As discussed above the only factor relating T (or $f$) to $l$ is the constant C, therefore, the accuracy of the device is very high and largely independent of temperature changes and power supply fluctuations.

I claim:
1. A liquid level measuring device comprising:
   a. an oscillator made up of a transmission line positionable in the liquid so that the liquid surface provides a reflection causing discontinuity in said line and an electrically energized tunnel diode connected to said line and transmitting a wavefront along said line when switched from one state to the other and being switched to a second state by a reflected wavefront obtained from said line, and
   b. means for measuring the period or frequency of oscillation of said oscillator, said period or frequency being related to the distance from the switching device along the transmission line to the liquid surface.

2. Apparatus for measuring the surface level of conductive or high permittivity liquids comprising:
   a. a transmission line having first and second conductors spaced one from the other with a first end of said line adapted to be placed below the liquid surface;
   b. a tunnel diode connected to the second end of said line and adapted to oscillate from a first stable state, which transmits a wavefront along the line, to a second stable state when the wavefront, phase reversed and partially reflected from the liquid surface, reaches the second end, and back to the first stable state on termination of the reflected wave; and
   c. detecting means connected across the second end of said line and adapted to indicate the liquid level in terms of the period or frequency of oscillation.

3. Apparatus as in claim 2 wherein the transmission line is a rigid coaxial line made up to an inner metal conductor and a cylindrical metal outer conductor in spaced relation and electrically insulated from the inner conductor.

4. Apparatus as in claim 3 wherein the said cylindrical, metal, outer conductor contains perforations over at least some part of its operating length for ready and rapid passage of liquid into and out of the space between conductors.

5. Apparatus as in claim 2 wherein the transmission line includes a length of flexible coaxial cable electrically connected to a length of rigid coaxial line made up of an inner metal conductor and a cylindrical outer conductor in spaced relation and electrically insulated from the inner conductor.

* * * * *